United States Patent [19]

Holly et al.

[11] Patent Number: 4,535,505
[45] Date of Patent: Aug. 20, 1985

[54] METHOD AND APPARATUS FOR FORMING A PATTY TO ACCOMMODATE TISSUE FIBER FLOW

[75] Inventors: Harry H. Holly, Boca Raton, Fla.; James A. Holly, Crestwood, Ill.

[73] Assignee: Holly Systems, Inc., Boca Raton, Fla.

[21] Appl. No.: 607,965

[22] Filed: May 7, 1984

Related U.S. Application Data

[62] Division of Ser. No. 443,212, Nov. 23, 1982.

[51] Int. Cl.³ .............................................. A22C 7/00
[52] U.S. Cl. ........................................... 17/45; 17/32; 426/516; 425/228; 425/573
[58] Field of Search ...................... 17/32, 45; 426/513, 426/516; 425/227, 228, 239, 240, 573

[56] References Cited

U.S. PATENT DOCUMENTS

| | | |
|---|---|---|
| 444,052 | 1/1891 | Hottman . |
| 2,794,210 | 6/1957 | Opiekon . |
| 2,836,775 | 10/1945 | Balzarini . |
| 2,858,219 | 10/1958 | Benson . |
| 2,869,602 | 1/1959 | Rathjen .............................. 241/82.5 |
| 3,009,413 | 11/1961 | Alexander et al. . |
| 3,052,919 | 9/1962 | Rayburn . |
| 3,137,029 | 6/1964 | Zolt . |
| 3,163,541 | 12/1964 | Mainhardt et al. . |
| 3,293,688 | 12/1966 | Holly ..................................... 17/32 |
| 3,574,633 | 4/1971 | Flier . |
| 3,793,466 | 2/1974 | Hawkins et al. ...................... 426/271 |
| 3,834,849 | 9/1974 | Supran .................................. 425/206 |
| 3,851,355 | 12/1974 | Hughes . |
| 3,863,020 | 11/1973 | Robinson . |
| 3,903,315 | 9/1975 | Giles et al. ............................. 426/388 |
| 3,939,530 | 2/1976 | Holly . |
| 3,991,440 | 11/1976 | Hendrickson, Jr. . |
| 4,036,997 | 7/1977 | Ver Burg . |
| 4,043,728 | 8/1977 | Holly . |
| 4,068,008 | 1/1978 | Orchard .......................... 426/513 X |
| 4,113,415 | 9/1978 | Holly . |
| 4,118,831 | 10/1978 | Holly et al. . |
| 4,138,768 | 2/1979 | Roth . |
| 4,148,598 | 4/1979 | Colosimo et al. ...................... 17/32 |
| 4,182,003 | 1/1980 | Lamartino et al. . |
| 4,205,415 | 6/1980 | Orchard ................................. 17/32 |
| 4,272,864 | 6/1981 | Holly ..................................... 17/45 |
| 4,293,979 | 10/1981 | Colosimo et al. ...................... 17/32 |
| 4,317,259 | 3/1982 | Wagner ................................. 17/32 |
| 4,338,702 | 7/1982 | Holly .................................... 17/32 |
| 4,343,608 | 8/1982 | Holly .................................... 17/45 |
| 4,356,595 | 11/1982 | Sandberg et al. ...................... 17/45 |
| 4,372,008 | 2/1983 | Sandberg .............................. 17/32 |

OTHER PUBLICATIONS

"Hollymatic 580 Instruction Manual Parts List", (dated 6-75).

Primary Examiner—Willie G. Abercrombie

[57] ABSTRACT

A method and apparatus are disclosed in which a mold plate is provided for defining a mold opening and in which a foraminous member is provided with rows of apertures communicating between an upstream side and downstream side of the member. Narrow slots connect the adjacent apertures in each row. The foraminous member is disposed with the downstream side adjacent the mold plate and has spaced-apart ribs on the upstream side oriented between, and parallel to, the rows of apertures. Pressurized food material is forced from the upstream side of the foraminous member through the apertures to the downstream side of the foraminous member and into the mold opening as discrete extrudate masses which together define a packed array forming the patty. An agitator bar with spaced-apart teeth is disposed on the upstream side of the foraminous member with a tooth disposed between each pair of adjacent ribs. This bar is reciprocated across the upstream side of the member to dislodge tissue fibers that may have lodged on the upstream side of the member.

13 Claims, 16 Drawing Figures

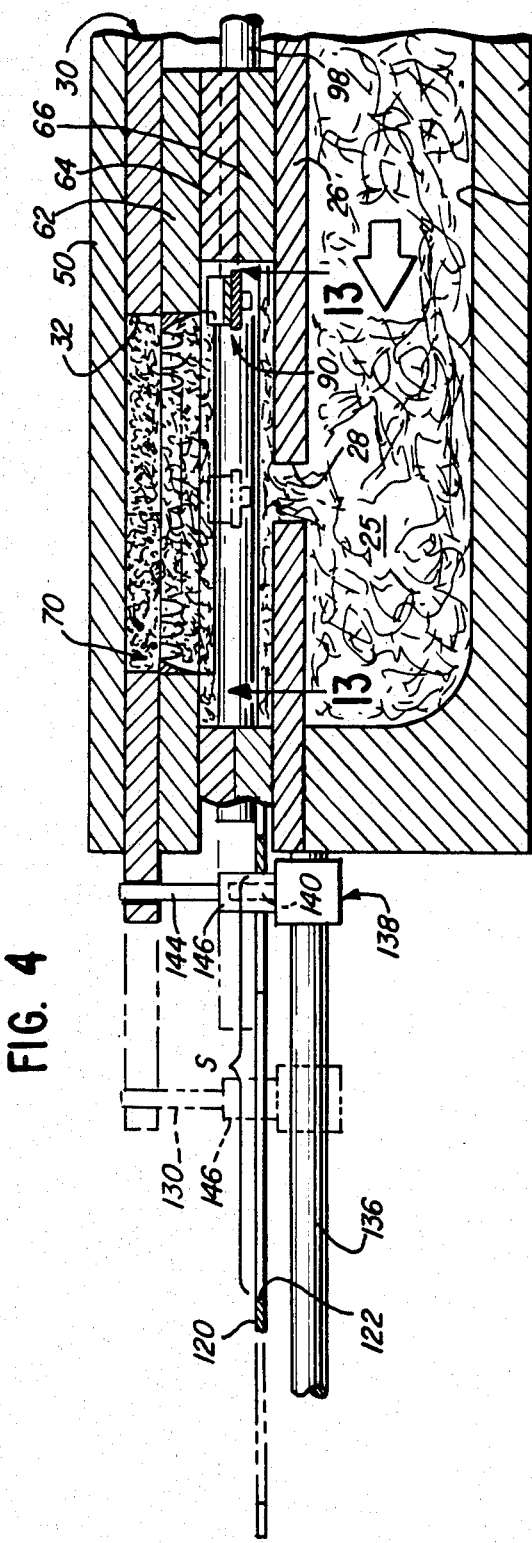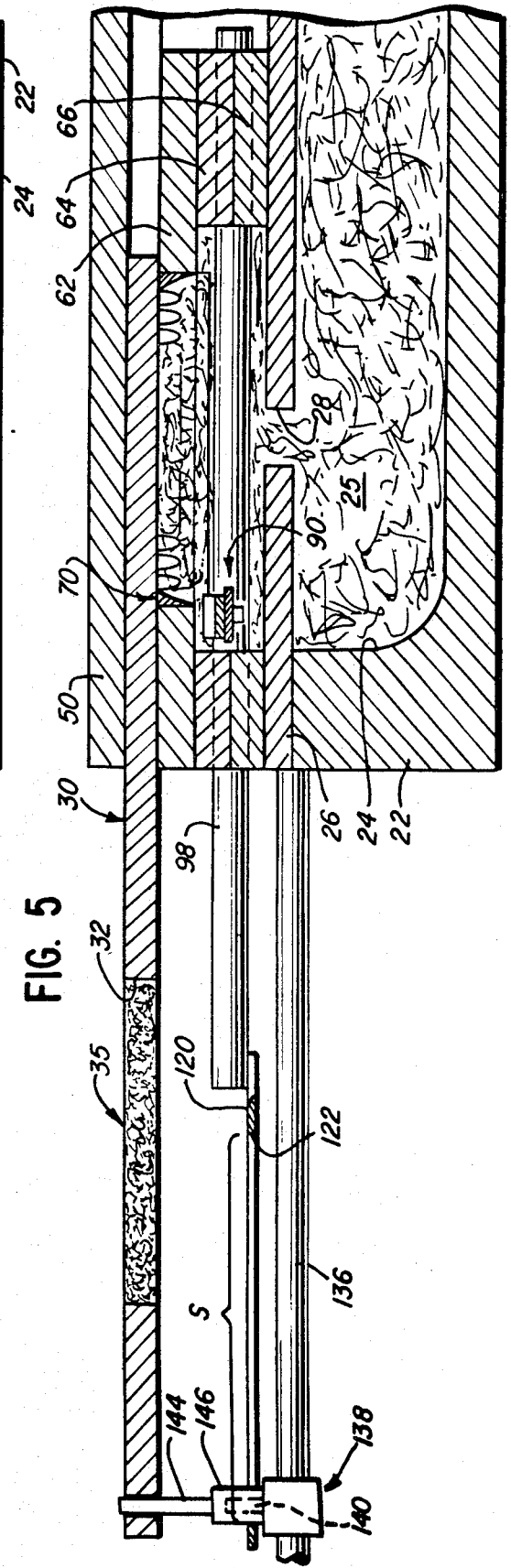

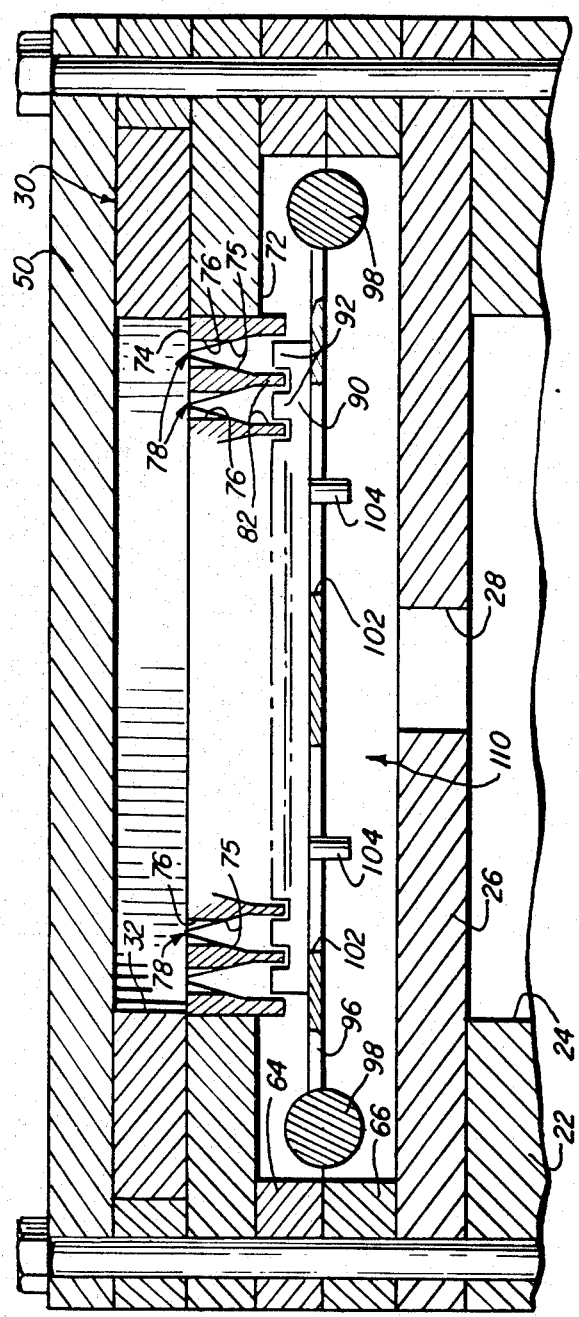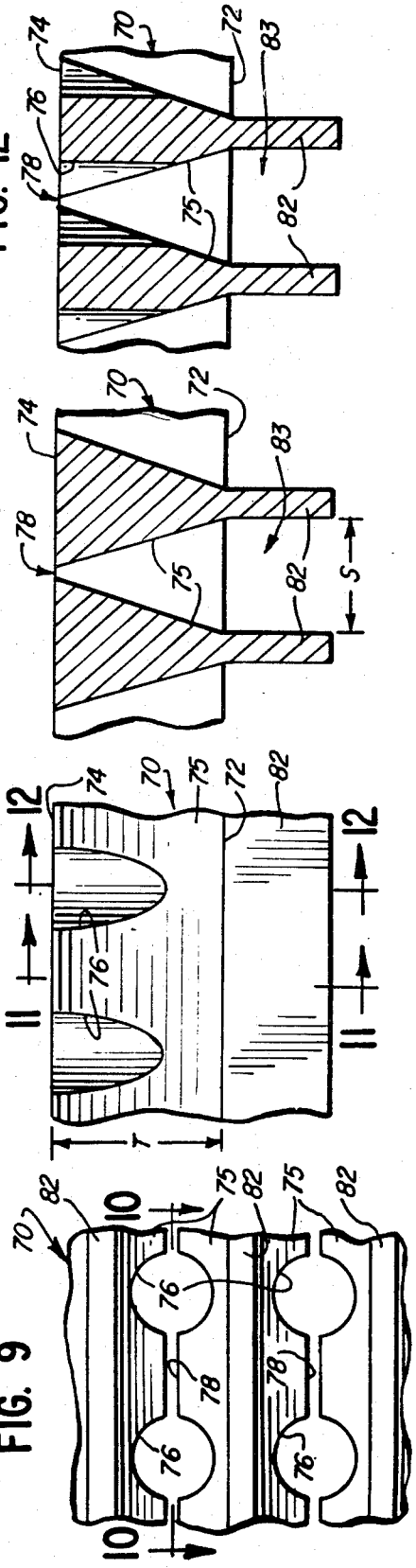

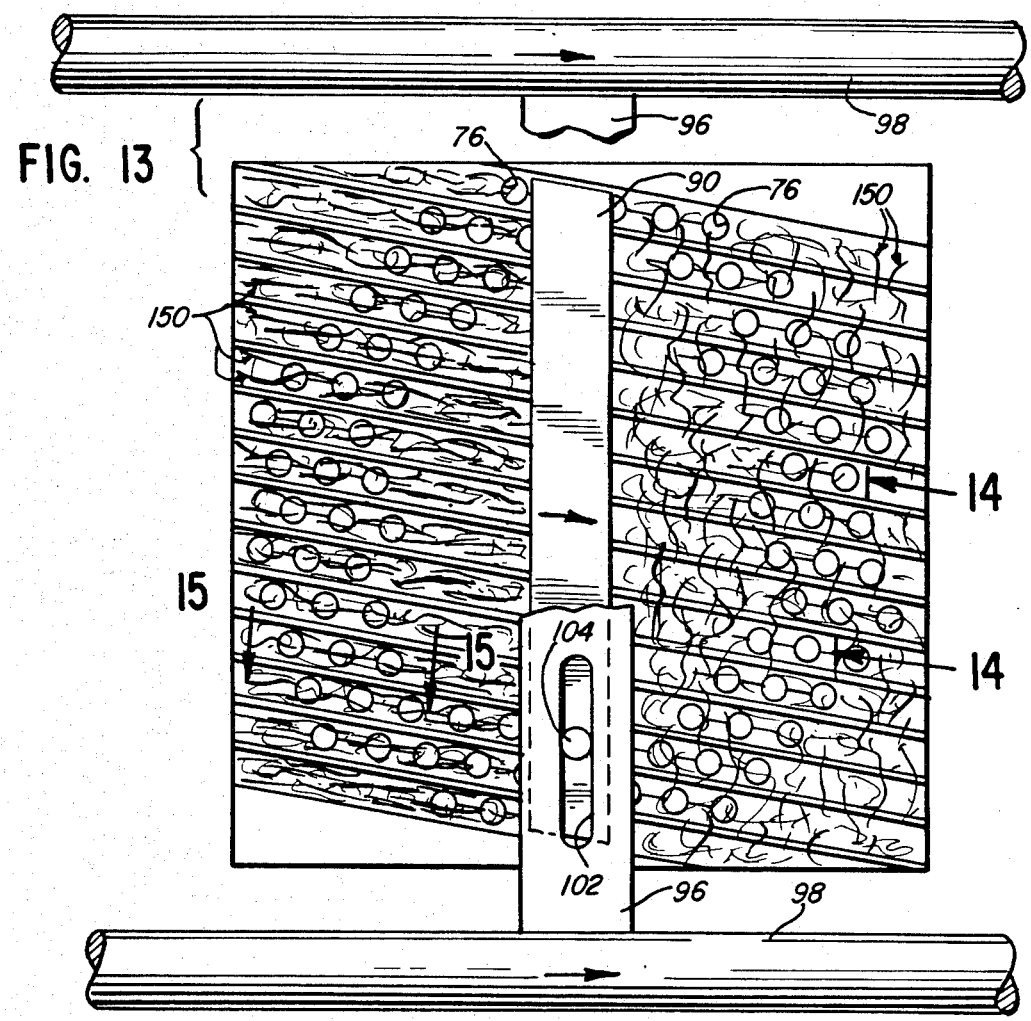
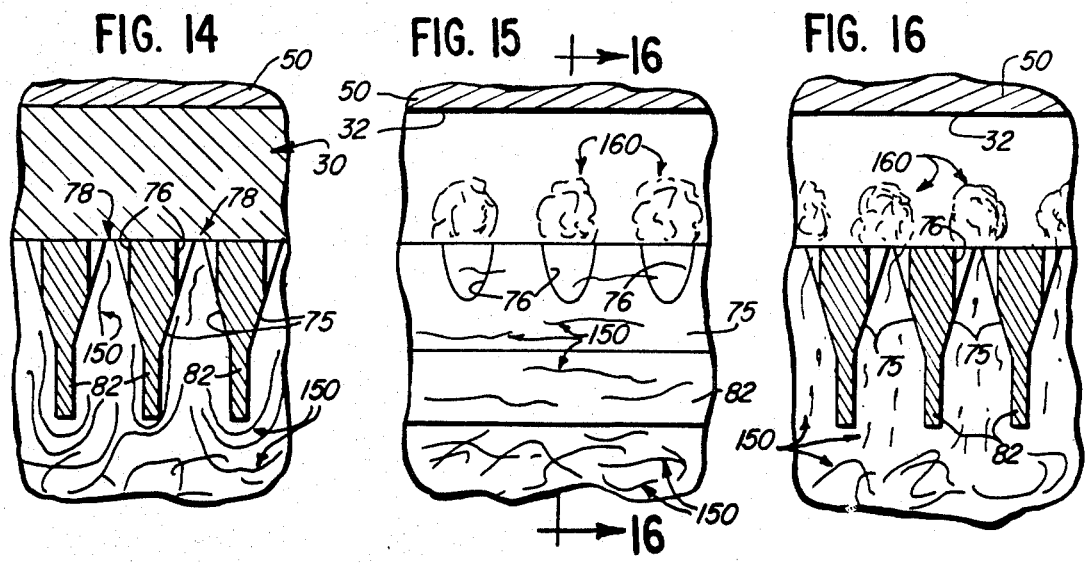

METHOD AND APPARATUS FOR FORMING A PATTY TO ACCOMMODATE TISSUE FIBER FLOW

This is a division, of application Ser. No. 443,212, filed Nov. 23, 1982.

TECHNICAL FIELD

This invention relates to fabrication of a patty of plastic food material containing tissue fibers, such as are found in pieces of food and especially in meat.

BACKGROUND OF THE INVENTION

One of the inventors of the present invention, Harry H. Holly, has previously invented a novel patty of plastic food material, such as ground meat and the like, as well as novel methods and apparatus for forming the patty, wherein, inter alia, the food material is forced through a foraminous member into a mold to form a patty in which the food material defines interstitial voids for entrapping air and providing retention of cooking juices to promote more rapid and uniform cooking of the patty. Such methods and apparatus are disclosed in the Harry H. Holly U.S. Pat. Nos. 4,272,864 and 4,338,702.

When food material that contains tissue fibers, especially meat and the like, is forced through a foraminous member, opposite end portions of a single fiber can be forced into different apertures in the foraminous member. The fibers, being stringy and thin, are not easily severed under the influence of conventional molding pressures.

A number of such fibers may be forced against the upstream side of the foraminous member in a manner that tends to plug up the foraminous member apertures. This tendency of tissue fibers to plug up foraminous member apertures was identified by Harry H. Holly and is described in detail in the above-referenced U.S. Pat. No 4,272,864 with reference to FIG. 23 of that patent.

Commercially acceptable methods and apparatus for forming patties of food material containing tissue fibers must have the capability for sequentially forming many hundreds or thousands of patties. If the process results in the apparatus "plugging up" with tissue fibers, the process must be terminated and the apparatus shut down to enable the apparatus to be cleaned. Obviously, frequent shut downs for such a purpose are undesirable.

The basic methods and apparatus described and claimed in the above-referenced U.S. Pat. Nos. 4,272,864 and 4,338,702 solve the plugging problem. Such methods and apparatus effectively dislodge tissue fibers from a foraminous member in a molding apparatus so as to avoid plugging up the foraminous member in the apparatus.

This basic concept, as manifested in general methods and apparatus for dislodging the tissue fibers, is set forth in the disclosures and claims in the above-referenced U.S. Pat. Nos. 4,272,864 and 4,338,702. In addition, these two U.S. patents describe a number of specific methods and apparatus for preventing the undesirable plugging up of a foraminous member with tissue fibers by dislodging the fibers. One of the specific methods includes forcing the food material first in one direction through the foraminous member and then in a second, opposite direction through the foraminous member.

Another approach utilizing the general methods of the inventions of U.S. Pat. Nos. 4,272,864 and 4,338,702 for preventing the plugging up of a foraminous member in a patty molding apparatus is disclosed in the James A. Holly U.S. Pat. No. 4,343,068. That patent describes the use of probe means that are pushed into the apertures of the foraminous member to dislodge the tissue fibers from the upstream side of the foraminous member.

Although the specific embodiments of the apparatus and methods disclosed in the above-discussed U.S. patents function well to dislodge tissue fibers from the upstream side of the foraminous member, it would be desirable to provide a less complex form of the method and apparatus for dislodging tissue fibers. Further, it would be beneficial if such an improved method and apparatus could be effected with a minimum of movement of the food material so as to avoid undesirable effects of excessive working of the food material. Excessive working of some types of food material, such as ground beef, can make the food material less tender.

Finally, it would be advantageous if apparatus could be provided for quickly and easily converting conventional patty molding machines to the improved type of molding machine wherein the food material is forced through a foraminous member. Such a "conversion" apparatus should also desirably have the capability for dislodging tissue fibers from the upstream side of the foraminous member to avoid plugging up of the apparatus.

SUMMARY OF THE INVENTION

A method and apparatus is provided for forming a patty of plastic food material containing tissue fibers. A foraminous member is provided with an upstream side and a downstream side. The foraminous member has apertures communicating between the upstream side and the downstream side. Mold parts are provided on the downstream side of the foraminous member to define a mold opening and to define at least a portion of a mold cavity having the shape of at least a portion of the exterior surface of the patty.

The mold parts are positioned to dispose the mold opening at a patty molding position adjacent the downstream side of the foraminous member. Then, food material is forced under pressure from the upstream side of the foraminous member through the apertures to the downstream side of the foraminous member and into the mold opening as extrudate masses which together define a packed array forming the patty.

To reduce the tendency of the apparatus to plug up with tissue fibers, the foraminous member apertures may be arranged in parallel rows with slots through the foraminous member connecting the adjacent apertures in each row. The tissue fibers which would otherwise extend across the foraminous member between adjacent apertures in each row can then be forced through the slots into the mold opening so that they become part of the patty.

Another means for reducing the tendency of the apparatus to plug up with tissue fibers involves agitating the food material adjacent the upstream side of the foraminous member to dislodge tissue fibers.

In the preferred form of the apparatus, both the slot structure between the apertures and the agitating means are provided and function together for greatly reducing, if not completely eliminating, the tendency of tissue fibers to accumulate on the upstream side of the foraminous member.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, and in which like numerals are employed to designate like parts throughout the same.

FIG. 4 is a view similar to FIG. 3, but showing with dashed lines the mold plate about midway between the patty ejecting position and the patty molding position, and showing with solid lines the mold plate in the patty molding position with food material being forced into the mold plate mold cavity;

FIG. 5 is a view similar to FIG. 4, but showing the mold plate in the patty ejecting position;

FIG. 8 is a fragmentary, cross-sectional view taken generally along the plane 8—8 in FIG. 3 with the mold plate and agitator bar at about the midpoint between the patty molding and patty ejecting positions;

FIG. 9 is a greatly enlarged view of a portion of the top surface of the foraminous member illustrated in FIG. 6;

FIG. 10 is a fragmentary view taken generally along the plane 10—10 in FIG. 9;

FIG. 11 is a fragmentary, cross-sectional view taken generally along the plane 11—11 in FIG. 10;

FIG. 12 is a fragmentary, cross-sectional view taken generally along the plane 12—12 in FIG. 10;

FIG. 13 is a greatly enlarged, bottom view taken generally along the plane 13—13 in FIG. 4 with the agitator bar shown at the approximate midpoint of its travel as illustrated in dashed lines in FIG. 4;

FIG. 14 is a greatly enlarged, fragmentary, cross-sectional view taken generally along the plane 14—14 in FIG. 13;

FIG. 15 is a greatly enlarged, fragmentary, cross-sectional view taken generally along the plane 15—15 in FIG. 13; and FIG. 16 is a fragmentary, cross-sectional view taken generally along the plane 16—16 in FIG. 15.

DESCRIPTION OF THE PREFERRED EMBODIMENT

Figure 1:
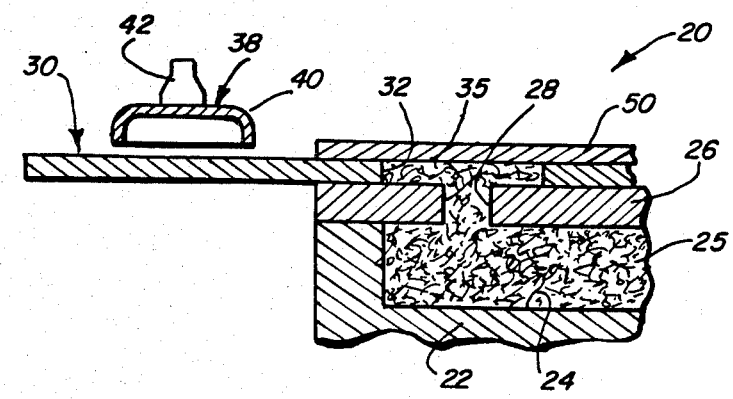
FIG. 1 is a fragmentary, partial cross-sectional view of a portion of a machine for molding a patty of plastic food material which contains tissue fibers.

While this invention is susceptible of embodiment in many different forms, there is shown in the drawings and will herein be described in detail preferred features of the invention. It will be understood, however, that the present disclosure is to be considered as an exemplification of the principles of the invention and is not intended to limit the invention to the specific form of the combination of features that are illustrated and described.

The precise shapes and sizes of the components herein described are not essential to the apparatus unless otherwise indicated.

It will be understood that reference is made herein, and in the claims, to various terms such as "food material," "tissue," "fiber," and "plastic." Each such term is used in a sense that may have a denotation not necessarily identical to the denotation of the term as used in the technical fields of chemistry, medicine, rheology, and the like. Rather, such terms are used to describe various substances exhibiting the characteristics discussed herein and to which the present invention is directed.

For ease of description, the apparatus disclosed herein is described in a normal operating position and terms such as upper, lower, horizontal, etc. will be used with reference to the normal operating position. It will be understood, however, that the apparatus may be manufactured, stored, transported, and sold in an orientation other than the normal operating position described.

The apparatus disclosed herein has certain conventional mechanisms, including drive mechanisms, food material pressurizing mechanisms, food material receiving structures, and control mechanisms, the details of which, though not fully illustrated or described, will be apparent to those having skill in the art and an understanding of the necessary functions of such mechanisms.

The apparatus disclosed herein may be constructed of a variety of materials. The choice of material in some cases is dependent upon a particular application involved and other variables, as those skilled in the art will appreciate.

Part of a conventional machine 20 for forming or molding a patty of plastic food material containing tissue fibers, including pieces of meat and the like, is illustrated in FIG. 1. Machines of this type are manufactured by, among others, Hollymatic Corporation, Park Forest, Ill., U.S.A. Machines of this type can be adapted to use the subassembly 60 (FIG. 2) of the present invention. The specific embodiment of the subassembly 60 of the present invention illustrated herein is especially designed for being used with ("converting") molding apparatus or machines marketed by Hollymatic Corporation in the United States of America under the designations "Hollymatic 500" and "Hollymatic 580".

Although the specific embodiments of the novel processes and subassembly apparatus disclosed herein are adapted for use with, and are illustrated herein as incorporated in, the above-identified conventional Hollymatic Corporation machines, it is to be realized that the principles of the present invention may also be used, with appropriate modifications, in other patty molding machines of the same general type as the Hollymatic Corporation machines wherein food material is forced under pressure into a mold opening to form a patty.

As illustrated in FIG. 1, the machine 20 includes a lower portion 22 defining part of a first pressurizable feed chamber or food material reservoir 24. The top of the reservoir 24 is covered and defined by a cover plate 26. The cover plate 26 defines a feed aperture 28 through which pressurized food material 25 is forced. Depending on the machine design, the feed aperture 28 may be located as illustrated to supply food material 25 to the center portion of the ultimately formed patty 35 or may alternatively be located to supply the food material 25 to a region at or near the periphery of the patty 35.

The food material 25 is moved or conveyed forward in the chamber 24 and upwardly through the aperture 28 by a mechanism capable of pressurizing the material 25 within the chamber or reservoir 24. Though such a mechanism is not illustrated in the present disclosure, any number of suitable conventional mechanisms may be employed. An example of one such suitable mechanism is that disclosed and illustrated in the U.S. Pat. No. 3,293,688. In the above-discussed Hollymatic 500 and Hollymatic 580 molding machines, the pressurizing mechanism comprises a reciprocating compression blade and pin plate of conventional design known to those skilled in the art and generally described in the above-discussed U.S. Pat. Nos. 4,272,864 and 4,338,702. However, any suitable feed mechanism may be used with the molding machine 20 and subassembly 60. The specific feed mechanism construction per se forms no part of the present invention.

A mold plate 30 is slidably disposed on top of the food material reservoir cover plate 26. The mold plate 30 has a mold opening 32 which defines at least a peripheral portion of a mold cavity having the shape of the patty 35 that is to be ultimately molded. The mold plate 30 is adapted to be moved between a patty molding position wherein the mold opening 32 receives the pressurized food material 25 (as illustrated in FIG. 1) and a patty ejecting position (to the left of the mold plate position illustrated in FIG. 1) wherein the mold opening 32 is spaced away from the patty molding position and is generally exposed to permit ejection of the molded patty 35 from the mold plate 30.

Typically, the formed patty 35 is automatically ejected from the mold plate 30 by a suitable patty ejecting mechanism represented generally by reference numeral 38. The patty ejecting mechanism 38 may be of any suitable conventional type and may include a disc-like or cup-like member 40 mounted to a drive rod 42. The ejecting mechanism 38 is timed to intermittently reciprocate in the vertical direction to eject the formed patty 35 when the mold plate 30 periodically moves a molded patty 35 into the patty ejecting position. The construction and operation of the patty ejecting mechanism 38 per se forms no part of the present invention.

An upper guide plate 50 is fixed to the cover plate 26 at a spaced location therefrom so that the plates 50 and 26 together define a guideway between which the mold plate 30 is disposed and along which the mold plate 30 is reciprocated. As best illustrated in FIG. 1, the cover plate 26, the upper guide plate 50, and the mold plate 30 all function together as mold parts defining the mold cavity. Specifically, the cover plate 26 defines a portion of the bottom of the mold cavity, the mold plate 30 defines the peripheral or vertical side portion of the mold cavity, and the upper guide plate 50 defines the top surface of the mold cavity.

Plastic food material, which may be meat that has been chopped, ground, or otherwise reduced to relatively small pieces, can be conveniently formed into a patty with the general type of machine 20 illustrated in FIG. 1. However, for the various reasons set forth in the above-discussed U.S. Pat. Nos. 4,272,864 and 4,338,702, such a patty, if made from ground beef, can have a number of undesirable characteristics. Specifically, such a patty may have many of the tissue fibers oriented and aligned in generally parallel lines. The aligned tissue fibers contract during the cooking process and cause a shrinkage of the patty in the alignment direction.

Further, patties made with such conventional apparatus are not as porous as would be desired. Such a patty, being more dense than desired, has less of a capability for entrapping air and retaining cooking juices. Consequently, the cooked patty does not have the degree of porosity and juiciness that would be desired.

Formation of a patty with a foraminous member according to the general principles of the above-discussed U.S. Pat. Nos. 4,272,864 and 4,338,702 can provide an improved patty that does not suffer from the above-described deficiencies. Moreover, the present inventors have determined that a less complex assembly can be provided which enables conventional machines to form such an improved patty.

To this end, a conventional patty forming machine 20 of the type generally illustrated in FIG. 1 may be readily converted, according to the principles of the present invention, to an improved machine. Such an improved machine effects the formation of the patty with the use of a foraminous member and includes novel features for reducing the tendency of the foraminous member to plug up with tissue fibers.

Figure 2:
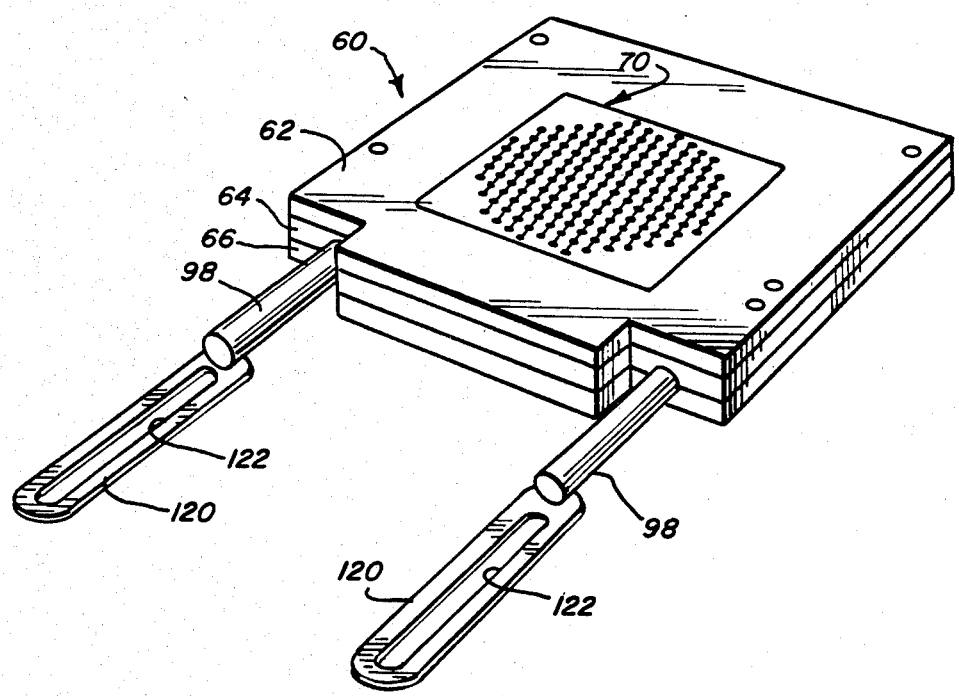
FIG. 2 is a perspective view of a subassembly apparatus of the present invention for converting the machine illustrated in FIG. 1 to an improved patty molding apparatus.
Figure 3:
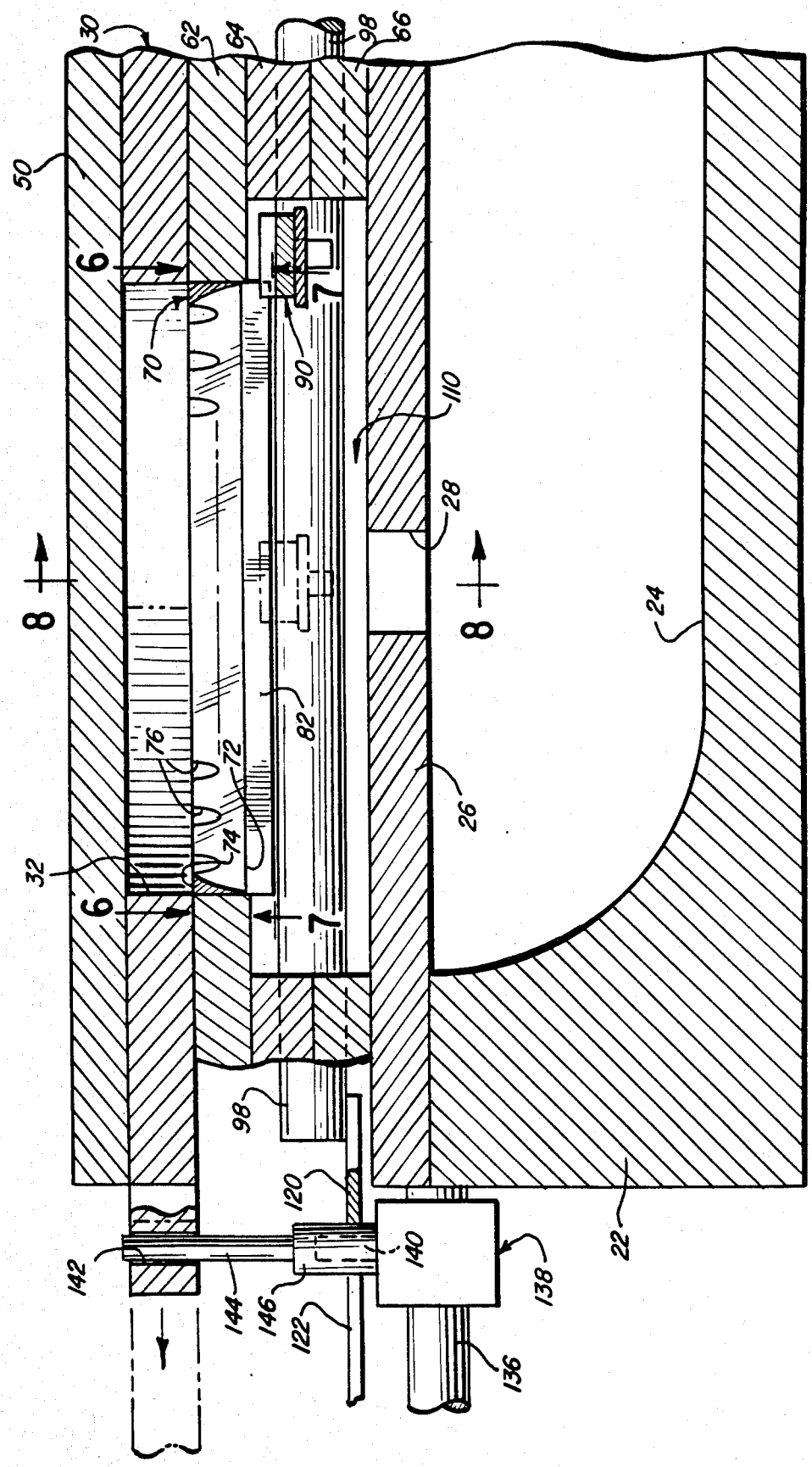
FIG. 3 is an enlarged, fragmentary, cross-sectional view similar to FIG. 1, but showing the subassembly of FIG. 2 mounted in the machine of FIG. 1 with the machine's mold plate being illustrated with solid lines in the patty molding position and with the mold plate being illustrated with dashed solid lines about midway between the patty molding position and the patty ejecting position.

The subassembly 60 illustrated in FIG. 2 may be conveniently used for such a modification of a conventional molding machine. The subassembly 60 includes a top plate 62 and underlying plates 64 and 66. The bottom underlying plate 66 is adapted to be disposed on top of the cover plate 26 of the machine 20 as best illustrated in FIGS. 3 and 8.

Figure 6:
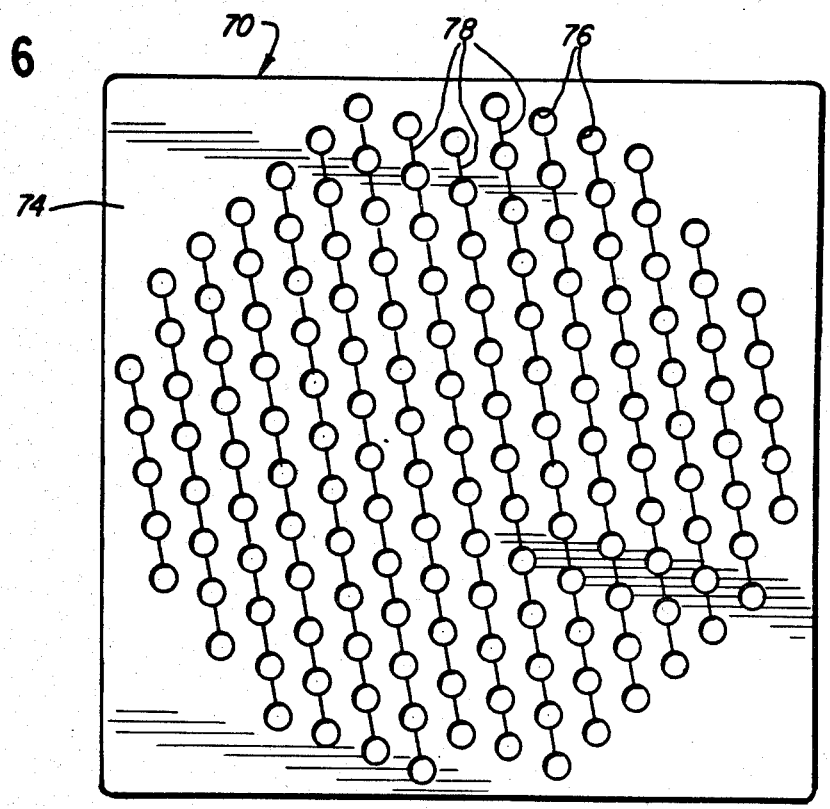
FIG. 6 is a top plan view of the foraminous member of the subassembly taken generally along the plane 6—6 in FIG. 3.

The upper plate 62 includes a foraminous member 70 which may be a separate insert or which may be formed integrally with the plate 62. In any case, the bottom of the foraminous member 70 defines an upstream side 72 (FIGS. 3 and 7) and the top of the member 70 defines a downstream side 74 (FIGS. 3 and 6). The foraminous member 70 also has a plurality of rows of V-shaped channels 75 (FIGS. 7-12) on the upstream surface 72. Along the channels 75 are rows of apertures 76 extending through the member 70 between the upstream side 72 and the downstream side 74. Each row of apertures 76 is in registry with, and is defined in, a channel 75.

In the preferred embodiment illustrated, the foraminous member apertures 76 are drilled in the V-shaped channels 75 to form generally cylindrical surfaces or bores having a diameter of about 4.8 mm. at the downstream surface 74. The thickness of the foraminous member 70, designated by dimension "T" in FIG. 10, is about 9.53 mm. The V-shaped channels 75 are each about 6.35 mm. wide at the upstream side of the foraminous member (dimension "S" in FIG. 11). Hence, the cylindrical surfaces of the bores 76 merge into the diverging walls of the channels 75 toward the upstream side 72 of the foraminous member 70 as shown in FIG. 11 where the channels 75 are wider than the bores 76. The distance between center lines of adjacent apertures 76 in each row is about 9.53 mm. Different size apertures and a different spacing may be employed.

Figure 7:
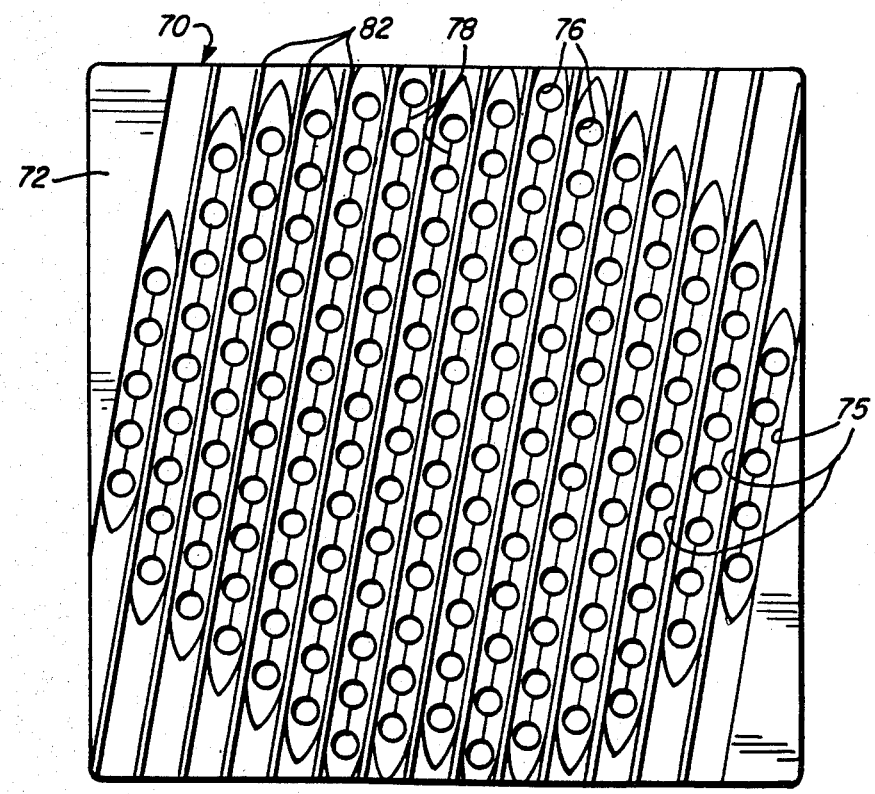
FIG. 7 is a bottom plan view of the foraminous member of the subassembly taken generally along the plane 7—7 in FIG. 3.

With reference to FIGS. 6 and 7, it is seen that the channels 75 and rows of apertures 76 are oriented at a common angle skewed relative to the straight line path of movement of the mold plate 30. In the embodiment illustrated, the rows of channels 75 and apertures 76 are at an angle of about 10 degrees relative to the straight line path of motion of the mold plate 30. Other skew angles may also be used. The desirability of an angled orientation of the rows of apertures 76 is explained in detail hereinafter.

As best illustrated in FIGS. 6, 8, 9, 11, and 12, the top or apex of each V-shaped channel 75 is open to the downstream side of the foraminous member 70 to define a relatively narrow slot 78 between, and connecting, adjacent apertures 76 in each row. In the embodiment illustrated, the slots 78 have a width of about 0.64 mm. These slots 78 function to permit the passage of tissue fibers that might otherwise become lodged against the upstream side 72 of the foraminous member 70 as described in detail hereinafter.

As best illustrated in FIGS. 3, 7, 8 and 12, the upstream side 72 of the foraminous member 70 has a plurality of spaced-apart projecting ribs 82 aligned parallel to the channels 75 and rows of apertures 76. Each rib 82 is located between a pair of adjacent rows of apertures 76. Each pair of adjacent ribs 82 defines between them a square cross section, channel-like region 83 (FIGS. 11 and 12) communicating with a V-shaped channel 75 and a row of apertures 76. Although not illustrated, the distal end of each rib 82 may be rounded if desired to facilitate flow of the food material.

In the embodiment illustrated, each rib 82 is about 1.59 mm. thick and has as height of about 6.35 mm. The spacing between adjacent ribs 82 is 6.35 mm. (dimension "S" in FIG. 11). In cooperation with the slots 78 and/or a novel agitator mechanism that will next be described, the ribs 82 function to effect a process which tends to permit passage of tissue fibers from, or prevent the lodging of tissue fibers on, the upstream side 72 of the foraminous member 70.

An agitator means for agitating the food material 25, which agitator means includes, inter alia, an agitator bar 90, is disposed adjacent the upstream side 72 of the foraminous member 70. As best illustrated in FIGS. 3 and 8, the agitator bar 90 extends across the bottom or upstream side 72 of the foraminous member 70 and includes a plurality of spaced-apart, elongate teeth 92. Each tooth 92 is angled the same as the ribs 82. Each tooth 92 is positioned between a pair of adjacent ribs 82 of the foraminous member 70. In the embodiment illustrated, the thickness of each tooth 92 is a little less than the 6.35 mm. spacing between adjacent ribs 82 to provide clearance—although the teeth 92 may by thicker and may even slide against the ribs 82 if desired. Each tooth 92 projects between the ribs 82 so that about 2.38 mm. of the rib height is overlapped by the tooth 92.

The agitator bar 90 is supported and maintained in a plane generally parallel to the plane of movement of the mold plate 30 by a drive bar 96 which extends between two drive rods 98 that are slidably mounted in the plates 64 and 66. The drive bar 96 has a pair of spaced-apart, elongate slots 102 with each slot oriented so that its length is generally normal to the straight line path of movement of the mold plate 30. The agitator bar 90 has two downwardly projecting guide pins 104 and each guide pin 104 is received in one of the elongate slots 102 of the drive bar 96.

As illustrated in FIGS. 3 and 8, the plates 64 and 66 define an interior chamber 110 on the upstream side of the foraminous member 70. The agitator bar 90, the drive bar 96, and portions of the drive rod 98 are received within this chamber 110. The drive rods 98 are slidably received at the ends of the chamber 110 between the plates 64 and 66.

The drive rods 98 are reciprocated by a novel connection with the conventional mechanism employed for reciprocating the mold plate 30. Specifically, in the above-discussed Hollymatic 500 and Hollymatic 580 machines, the mold plate is reciprocated by a shuttle mechanism which includes a pair of shuttle bars 136 (FIGS. 3–5). One shuttle bar 136 is located along one side of the machine and other shuttle bar 136 being located along the other side of the machine. A shuttle assembly 138 is slidably disposed on the shuttle bars 136. The shuttle assembly 138 is connected to a suitable linkage system (not illustrated) driven by a suitable conventional mechanism (not illustrated) for reciprocating the shuttle assembly 138 at the desired frequency and stroke length along the shuttle bars 136.

The shuttle assembly 138 includes a drive pin 140 which, in the conventional (and unmodified) Hollymatic 500 and 580 machines, is received in a bore 142 (FIG. 3) in the overlying mold plate 30. When the Hollymatic 500 and 580 machines are modified to accommodate the novel subassembly apparatus 60 discussed above, the existing pin 140 serves as a means for mounting a longer pin 144. Specifically, the longer pin 144 includes an enlarged base member 146 (FIG. 3) with an aperture in which is received the pin 140. The longer pin 144 then projects upwardly into the bore 142 of the mold plate 30.

Each pin base member 146 is engaged with a forward end 120 of a drive rod 98. The forward end 120 of each drive rod 98 defines an elongate slot 122 in which the base member 146 is slidably received.

The Hollymatic 500 and 580 machine have a mold plate stroke length of about 20.32 cm. When the novel subassembly 60 is incorporated in such Hollymatic machines, the elongate slot 122 in the end 120 of each agitator bar drive rod 98 is about 10.16 cm. in length. The relationship between mold plate stroke length and the length of each drive rod slot 122 thus permits a lost motion action to occur.

Specifically, when the mold plate 30 is initially moved from the extended, patty ejecting position (FIG. 5) toward the patty molding position (FIG. 4), the pin base member 146 does not engage the end of the slot 122 (the right-hand end) until a predetermined amount L mold plate movement has occurred (about 10.16 cm. in the Hollymatic 500 and 580 machines).

Similarly, when the mold plate 30 is initially moved from the patty molding position (FIG. 4) to the patty ejecting position (FIG. 5), the pin base member 146 does not engage the other end of the slot 122 (the left-hand end) until the mold plate 30 has moved away from the patty molding position a predetermined amount L (about 10.16 cm. Hollymatic 500 and 580 machines).

If the novel subassembly 60 described above is incorporated in patty molding machines other than the Hollymatic 500 and 580 machines discussed above, then the mechanism for reciprocating the agitator bar drive rods 98 will, of course, be modified somewhat from that illustrated. Preferably, however, the agitator bar drive rods 98 will be connected, via a suitable lost motion linkage, to the mechanism for reciprocating the mold plate. Of course, the agitator bar drive rods 98 could be reciprocated by means independent of the means for reciprocating the mold plate.

In any case, the drive rods 98 are reciprocated in the directions parallel to the directions of reciprocation of the mold plate 30. However, owing to the angled orientation of the ribs 82 and of the agitator bar teeth 92, it is not possible for the agitator bar 90 to be moved in a straight line path that is parallel to the straight line path of reciprocation of the drive rods 98 and mold plate 30. The agitator bar teeth 92 must necessarily follow the angled path defined by the ribs 82. Movement of the drive bar 96 causes the drive bar 96 to engage the agitator bar pins 104 which project downwardly from the agitator bar 90 into the drive bar slots 102. As the drive pins 104 are urged along the cavity 110 by the drive bar 96, the agitator bar 90 is displaced in a direction perpendicular to the straight line path of movement of the drive rods 98 and mold plate 30. This movement is accommodated by the elongate slots 102 in the drive bar 96 which permit the agitator bar guide pins 104 to move longitudinally along the length of the slots in directions perpendicular to the straight line path of movement of the mold plate 30.

In operation, the mold plate 30 is moved to the patty molding position so as to dispose the mold opening 32 adjacent the downstream side 74 of the foraminous member 70. In this position, illustrated in FIG. 4, the agitator bar 90 is at one end of its path of movement (the right-hand end of the chamber 110 as illustrated in FIG. 4).

During the time that the mold plate 30 is moved from the patty ejecting position to the patty molding position illustrated in FIG. 4, the food material 25 is pressurized and is forced through the aperture 28 of the cover plate 26 and into the chamber 110. Initially, when the solid end portion of the mold plate 30 (the right-hand end portion of the mold plate as illustrated in FIG. 4) is moving over the foraminous member 70, the food material fills the apertures 76 of the foraminous member 70 and is compressed therein against the overlying mold plate 30 which is sliding therepast.

However, as the mold opening 32 begins to move over the foraminous member 70, the food material 25 begins to be forced into the mold opening 32 (initially at the left-hand portion of the foraminous member 70 as viewed in FIG. 4). The food material 25 is discharged under pressure into the mold opening 32 as the leading edge of the mold opening continues to uncover more apertures 76. Finally, when the mold plate 30 has been moved to the fully retracted, patty molding position illustrated in FIG. 4, all of the foraminous member 45 apertures 76 are uncovered and all of the apertures 76 function to admit pressurized food material into the mold opening 32 for completion of the patty molding step.

As the pressurized food material 25 flows through the apertures 76 of the foraminous member 70 into the mold opening 32, discrete extrudate masses of material 160 (FIGS. 15 and 16) are formed within, or by, the apertures 76. On the downstream side 74 of the foraminous member 70, the discrete masses of material 160 may expand circumferentially somewhat and surface portions of adjacent masses will ultimately come into contact. Portions of the masses 160 will also ultimately impinge upon the mold cavity surface defined by the upper plate 50.

The discrete masses of food material 160 passing into the mold cavity may also twist and turn to some extent, and, in some cases, may form corkscrew-like configurations. In any case, the food material is eventually forced through the foraminous member 70 so that the discrete extrudate masses 160 in the mold cavity above the foraminous member 70 together define a packed array forming the patty 35. Voids or air spaces exist between the packed extrudate masses 160 in the patty 35 to give the patty a relatively high degree of porosity.

The tissue fibers 150 (FIGS. 13 and 14) that may extend across the upstream side of the foraminous member between adjacent apertures 76 in a row of apertures will be forced with the pressurized food material 25 through the slot 78 at the bottom of each channel 75. Thus, such tissue fibers 150 that are aligned generally parallel to the aperture rows will not plug up the foraminous member apertures 76.

When the machine drive pins 144 first move to drive the mold plate 30 to the patty molding position (toward the right as viewed in FIG. 4), the drive rods 98 are not initially engaged by the pins base members 146. After some predetermined initial movement of the mold plate 30 away from the patty ejecting position, the base members 146 push the drive rods 98 inwardly (to the right as viewed in FIG. 4). This causes the agitator bar 90 to sweep across the upstream side of the foraminous member.

The agitator bar 90 is illustrated at about the midpoint of its movement across the foraminous member 70 in solid lines in FIG. 13 and in dashed lines in FIG. 4. As can be seen in FIGS. 13 and 14, the tissue fibers 150 tend to be randomly mixed or jumbled in a variety of orientations ahead of the moving agitator bar 90. Many of the tissue fibers 150 have an end portion extending in one of the apertures 76 of one row and another end portion extending in another of the apertures 76 of an adjacent row. Such tissue fibers become draped over the ribs 82 between the apertures 76 of adjacent rows. When the food material 25 is pressurized, the tissue fibers 150 are urged with even greater force against the upstream side of the foraminous member 70.

However, as the agitator bar 90 sweeps across the upstream side of the foraminous member 70, the tissue fibers 150 are sufficiently agitated that many become dislodged and oriented in other positions. Many of the tissue fibers 150 become oriented and positioned between the ribs 82 behind the agitator bar 90 as the agitator bar 90 passes by as illustrated in FIG. 13 and as illustrated in the enlarged views of FIGS. 15-16. When the tissue fibers 150 are thus reoriented, they can pass through the apertures 76 and slots 78 connecting the apertures 76. Thus, many of the tissue fibers 150 which would otherwise plug up the foraminous member 70 are caused to pass through the foraminous member 70.

A tissue fiber 150 that passes through a narrow slot 78 connecting adjacent apertures 76 may end up in the mold cavity with one portion of the fiber embedded in one extrudate mass 160 and with another portion of the fiber embedded in an adjacent extrudate mass. On the other hand, another tissue fiber 150 may pass through the foraminous member 70 in a generally endwise orientation so that the entire length of the fiber passes through a single aperture 76. In that case, the entire fiber 150 will probably become embedded within a single extrudate mass of material 160 formed in and by that single aperture 76.

After the mold opening 32 is filled, the mold plate 30 begins to move back to the patty ejecting position (FIG. 5). After a predetermined initial movement of the mold plate 30, the agitator bar 90 is again engaged and begins to sweep across the upstream side 72 of the foraminous member 70 (to the left as viewed in FIG. 5). When the mold plate 30 reaches the patty ejecting position (FIG. 5), the agitator bar 90 is also at the end of its return stroke and the patty 35 is ejected.

Not all of the tissue fibers 150 that may be hanging over one or more ribs 82 will necessarily be dislodged by one sweep of the agitator bar 90 across the foraminous member 70. However, each stroke of the mold plate 30 and agitator bar 90 provides additional agitation which dislodges tissue fibers 150. Indeed, the periodic reciprocation of the agitator bar 90 across the foraminous member 70 with each molding cycle functions to continuously effect a dislodging of the tissue fibers 150. A tissue fiber 150 that does not get dislodged during one sweep of the bar 90 will ultimately get dislodged during one of the subsequent sweeps of the bar 90.

In the illustrated embodiment, the teeth 92 of the agitator bar 90 do not contact or slide against the ribs 82. Further, the lower ends of the ribs 82 do not contact the portions of the bar 90 between the bar teeth 92. However, if desired, a design wherein portions of the bar 90 contact portions of the ribs 82 may be utilized.

As described above in detail, the foraminous member apertures 76 are arranged in rows and connected by narrow slots 78. The inventors of the present invention have determined that such a structure greatly reduces the tendency of a foraminous member to plug up with tissue fibers 150 when plastic food material containing such tissue fibers is forced through the foraminous member. Depending upon the nature of the food material, the size of the apertures, and the pressure on the food material, the tissue fibers 150 can still build up on the upstream side of the foraminous member in directions generally perpendicular to the lengths of the slots 78. The tissue fibers 150 will tend to extend from one row of apertures to an adjacent row of apertures and can plug up the foraminous member 70. Although the foraminous member 70 with slots 78 between adjacent apertures 76 in each row will not plug up as rapidly as does a foraminous member without such slots, it has been found preferable from a commercially practical standpoint to even further reduce, if not eliminate all together, the tendency of the foraminous member to plug up. This can be effected by providing the above-described agitator means or bar 90 in conjunction with the slotted structure of the foraminous member 70.

While the agitator means 90 may be employed with a foraminous member that does not have slots (such as slots 78) between the apertures 76, the inventors of the present invention have determined that there is still a tendency for the tissue fibers to plug up such a foraminous member without slots 78 even if an agitator means 90 is provided. Although a foraminous member without slots will plug up much less rapidly when an agitator means 90 is operated in accordance with the teachings of the present invention, the inventors have found it to be commercially desirable to provide the foraminous member with slots 78 in conjunction with the agitator means 90 in order to substantially reduce, if not eliminate all together, the tendency of the foraminous member to plug up with tissue fibers. When the foraminous member 70 is provided with slots 78 and when the agitator means 90 is used in conjunction with the foraminous member 70, then the assembly can be easily operated for commercially acceptable lengths of time (i.e., for a desired minimum throughput quantity of food material) without requiring the interruption of the operation to clean the assembly and remove tissue fibers from the upstream side of the foraminous member.

As pointed out in the above-discussed U.S. Pat. Nos. 4,272,864 and 4,338,702, it is desirable in many cases to provide a patty having a shear layer of somewhat dense food material on one or both of the top and bottom surfaces of the patty. The layer of dense food material is preferably about 0.4 mm. thick, although a shear layer of a greater or lesser thickness may be provided. Preferably, the shear layer is thick enough to aid in holding the formed patty together and to reduce the tendency of the patty to break apart during handling prior to, during, and after cooking. It is believed that such a layer also functions to trap the air and vapors in the interstitial voids below the layer during cooking to thereby promote more rapid and more uniform cooking of the patty and to thereby aid in retention of the cooking juices.

The above-described shear layer on one or both of the top and bottom surfaces of the patty can be formed with the apparatus of the present invention. This is effected by providing a certain amount of clearance between the top surface of the mold plate 30 and the bottom surface of the upper plate 50 and/or between the bottom surface of the mold plate 30 and the top surface of the cover plate 26. If the clearance between the mold plate and the overlying or underlying plate is sufficient, then the plastic food material trapped within this clearance region in the mold area will be subject to frictional forces when the mold plate is moved from the patty molding position to the patty ejecting position.

As the mold plate is so moved, the plastic food material in the clearance region is forced against the surface of the formed patty. In order to insure that the shear layer is properly formed and possesses sufficient structural integrity, the inventors of the present invention have determined that it is desirable to arrange the rows of apertures 76 and ribs 82 at a common angle skewed relative to the straight line path of motion of the reciprocating mold plate 30. As illustrated in FIGS. 2, 6, and 7, the angle need not be particularly large and an angle of about 10 degrees has been found to be satisfactory.

When the rows of apertures 76 are aligned at such an angle, the discrete, extrudate masses of material 25 being forced out of the apertures 76 are contacted at the top and bottom of the mold plate 30 by the overlying upper plate 50 and underlying plate 26, respectively. Movement of the mold plate 30 effects a frictional engagement of the extrudate masses. This forces and deforms some of the food material from each discrete mass in a direction generally parallel to the direction of movement of the mold plate 30. This tends to cause the deformed food material to be carried from one row of apertures 76 to an adjacent row of apertures 76 to thereby effect a linking of adjacent, angled rows of extrudate masses of material. If the rows of apertures 76 in the foraminous member 70 are not angled as illustrated in FIG. 6 and are instead oriented in rows generally parallel to the direction of reciprocation movement of the mold plate 30, little or no material from one row of apertures 76 would be moved to an adjacent row of apertures. Thus, the desired connection with a shear layer between adjacent rows of discrete extrudate masses would not be present to a significant extent.

The novel method, structure, and apparatus described herein for facilitating flow of tissue fibers through a foraminous member in a molding machine can be used in conjunction with other methods and apparatus for forming patties of food material. For example, if desired, the agitator means 90 may be used with the methods and apparatus disclosed in the above-discussed U.S. Pat. Nos. 4,272,864 and 4,338,702, including with the disclosed method and apparatus for moving the food material first in one direction and then in a second, opposite direction through the foraminous member. Also, the agitator means and foraminous member slot structure described herein may be used with the methods and apparatus disclosed in the above-discussed U.S. Pat. No. 4,343,068 that discloses the use of a probe means to dislodge tissue fibers from the foraminous member.

From the foregoing, it will be understood that numerous variations and modifications may be effected without departing from the true spirit and scope of the novel concept of the invention. It is to be understood that no limitation with respect to the specific apparatus and methods illustrated herein is intended or should be inferred. It is, of course, intended to cover by the appended claims all such modifications as fall within the scope of the claims.

What is claimed is:

1. A method for forming a patty of plastic food material containing tissue fibers, said method comprising the steps of:
   (a) providing a foraminous member having, (1) an upstream side, (2) a downstream side, (3) rows of apertures communicating between said upstream side and said downstream side with slots extending through said foraminous member connecting adjacent apertures in each row, (4) ribs on said upstream side with each rib being located generally parallel to, and between, two adjacent rows of apertures for defining between two adjacent ribs a channel-like region communicating with one of said rows of apertures;
   (b) providing means defining a food material reservoir adjacent the upstream side of said foraminous member;
   (c) providing mold parts defining a mold opening and at least a portion of a mold cavity having the shape of at least a portion of the exterior surface of said patty and positioning said mold parts to dispose said mold opening adjacent said downstream side of said foraminous member;
   (d) providing an agitator bar having spaced-apart teeth and disposing said agitator bar adjacent said upstream side of said foraminous member so that at least one tooth is received between two adjacent ribs;
   (e) forcing said food material under pressure from said food material reservoir through said foraminous member apertures and into said mold opening as extrudate masses which together define a packed array forming said patty; and
   (f) before, during, or after step (e), moving said agitator bar across at least part of the upstream side of said foraminous member to dislodge tissue fibers at the upstream side of said member.

2. A method for forming a patty of plastic food material containing tissue fibers, said method comprising the steps of:
   (a) providing a foraminous member having an upstream side and a downstream side, said foraminous member defining a plurality of rows of apertures extending through said member and defining slots through said foraminous member connecting adjacent apertures in each row, providing a movable mold plate on the downstream side of said foraminous member with a mold opening functioning to define at least a peripheral portion of a mold cavity having the shape of said patty, said mold plate being adapted to be moved between a patty molding position with said mold opening adjacent said foraminous member and a patty ejecting position spaced from said patty molding position, providing projecting ribs on said upstream side of said foraminous member with each rib being located parallel to, and between, two adjacent rows of apertures for defining between two adjacent ribs a channel-like region communicating with one of said rows of apertures, providing an agitator bar having spaced-apart teeth and disposing said agitator bar adjacent said upstream side of said foraminous member so that at least one tooth is received between two adjacent ribs, providing means for reciprocating said agitator bar across said upstream side of said foraminous member, providing a food material reservoir adjacent the upstream side of said first foraminous member, and providing means for pressurizing the food material in said reservoir;
   (b) initially arranging said mold plate to locate said mold opening at said patty ejecting position;
   (c) moving said mold plate to locate said mold opening at said patty molding position;
   (d) operating said food material pressurizing means to force said food material from said reservoir through said apertures in said foraminous member into said mold opening to form a patty;
   (e) moving said mold plate to move said mold opening with the molded patty carried therein to said patty ejecting position to expose the molded patty for ejection from the mold opening;
   (f) while effecting at least part of step (c) and part of step (d), moving said agitator bar in a first direction across the upstream side of said foraminous member to dislodge tissue fibers that may be lodged on the upstream side of said first foraminous member;
   (g) while effecting part of step (d) and at least part of step (e), moving said agitator bar in a second direction, opposite said first direction, across the upstream side of said foraminous member; and
   (h) after step (e), ejecting the molded patty from said mold plate mold opening.

3. An apparatus for molding a patty of plastic food material which contains tissue fibers, said apparatus comprising:
   (a) a foraminous member having an upstream side and a downstream side; said foraminous member defining a plurality of rows of apertures extending through said foraminous member and defining slots through said foraminous member connecting adjacent apertures in each row; said foraminous member including projecting ribs on said upstream side with each rib being located parallel to, and between, two adjacent rows of apertures for defining between two adjacent ribs a channel-like region communicating with one of said rows of apertures;
   (b) means defining a food material reservoir adjacent the upstream side of said foraminous member;
   (c) a mold plate defining a mold opening adapted to be moved between a patty molding position adjacent said foraminous member and a patty ejecting position spaced away from said patty molding position, said mold opening defining at least a portion of a mold cavity into which the food material is forced from said food reservoir on the upstream side of said foraminous member through said foraminous member apertures to form a molded patty when said mold opening is in said patty molding position;

(d) means for moving said mold plate between said patty molding position and said patty ejecting position; and (e) agitator bar having spaced-apart teeth with at least one tooth received between two adjacent ribs; and (f) means for reciprocating said agitator bar across the upstream side of said foraminous member for agitating said food material adjacent the upstream side of said foraminous member to dislodge tissue fibers that may have lodged on the upstream side of said foraminous member.

4. The apparatus in accordance with claim 3 in which said each said slot connecting said apertures in said foraminous member is defined by a generally V-shaped channel opening at the apex to said downstream side of said foraminous member.

5. A method for forming a patty of plastic food material containing tissue fibers, said method comprising the steps of:

(a) providing a foraminous member having an upstream side and a downstream side with apertures therein communicating between said upstream side and said downstream side, said apertures being arranged in rows with slots through said foraminous member connecting adjacent apertures in each row;

(b) providing mold parts defining a mold opening and at least a portion of a mold cavity having the shape of at least a portion of the exterior surface of said patty and positioning said mold parts to dispose said mold opening at a patty molding position adjacent said downstream side of said foraminous member;

(c) forcing said food material under pressure from the upstream side of said foraminous member through said apertures to the downstream side of said foraminous member and into said mold opening as extrudate masses which together define a packed array forming said patty whereby tissue fibers extending between adjacent apertures in one row on the upstream side of said foraminous member can pass through said slots; and (d) during or after step (c), moving at least some of said mold parts in a first straight line path from said patty molding position and moving an agitator bar across the upstream side of said foraminous member along a second straight line path that is at an angle skewed relative to said first straight line path.

6. An apparatus for molding a patty of plastic food material which contains tissue fibers, said apparatus comprising:

(a) a foraminous member defining an upstream side and a downstream side with apertures communicating between said upstream side and said downstream side, said apertures being arranged in rows with slots through said foraminous member connecting adjacent apertures in each row, said foraminous member including projecting ribs on said upstream side of said foraminous member with each rib being located parallel to, and between, two adjacent rows of apertures for defining between two adjacent ribs a channel-like region communicating with one of said rows of apertures;

(b) a mold plate defining a mold opening adjacent said foraminous member, said mold opening defining at least a portion of a mold cavity into which the food material is forced through said foraminous member apertures to form a molded patty;

(c) means for forcing said food material under pressure from the upstream side of said foraminous member through said apertures to the downstream side of said foraminous member and into said mold opening as extrudate masses which together define a packed array forming said patty whereby tissue fibers extending between adjacent apertures in one row on the upstream side of said foraminous member can pass through said slots; and (d) an agitator means for agitating said food material adjacent the upstream side of said foraminous member to dislodge tissue fibers that may have remained lodged on the upstream side of said foraminous member, said agitator bar including spaced-apart teeth with at least one tooth received between two adjacent ribs.

7. An apparatus for molding a patty of plastic food material which contains tissue fibers, said apparatus comprising:

(a) a foraminous member defining an upstream side and a downstream side with apertures communicating between said upstream side and said downstream side, said apertures being arranged in rows with slots through said foraminous member connecting adjacent apertures in each row, each said slot being defined by a generally V-shaped channel open at the apex to said downstream side of said foraminous member;

(b) a mold plate defining a mold opening adjacent said foraminous member, said mold opening defining at least a portion of a mold cavity into which the food material is forced through said foraminous member apertures to form a molded patty; and (c) means for forcing said food material under pressure from the upstream side of said foraminous member through said apertures to the downstream side of said foraminous member and into said mold opening as extrudate masses which together define a packed array forming said patty whereby tissue fibers extending between adjacent apertures in one row on the upstream side of said foraminous member can pass through said slots.

8. A method for forming a patty of plastic food material containing tissue fibers, said method comprising the steps of:

(a) providing a foraminous member having an upstream side and a downstream side with apertures therein communicating between said upstream side and said downstream side;

(b) providing mold parts defining a mold opening and at least a portion of a mold cavity having the shape of at least a portion of the exterior surface of said patty and positioning said mold parts to dispose said mold opening at a patty molding position adjacent said downstream side of said foraminous member;

(c) forcing said food material under pressure from the upstream side of said foraminous member through said apertures to the downstream side of said foraminous member and into said mold opening as extrudate masses which together define a packed array forming said patty;

(d) before, during, or after step (c), agitating said food material adjacent said upstream side of said foraminous member to dislodge a tissue fiber that may have lodged on the upstream side of said foraminous member;

(e) during or after step (c), moving at least some of said mold parts in a first straight line path to and from said patty molding position; and said step (d) including moving an agitator bar across the upstream side of said foraminous member along a second straight line path at an angle skewed relative to said first straight line path.

9. The apparatus in accordance with claim 20 in which said agitator means includes an agitator bar and means for reciprocating said agitator bar across the upstream side of said foraminous member.

10. An apparatus for molding a patty of plastic food material which contains tissue fibers, said apparatus comprising:

(a) a foraminous member defining an upstream side and a downstream side and having apertures communicating between said upstream and downstream sides, said apertures being arranged in rows in said foraminous member and said foraminous member including projecting ribs on said upstream side of foraminous member with each rib being located parallel to, and between, two adjacent rows of apertures for defining between two adjacent ribs a channel-like region communicating with one of said rows of apertures;

(b) mold parts defining a mold opening adjacent said foraminous member, said mold opening defining at least a portion of a mold cavity into which the food material can be forced through said foraminous member apertures to form a molded patty;

(c) means for forcing said food material under pressure from the upstream side of said foraminous member through said apertures to the downstream side of said foraminous member and into said mold opening as extrudate masses which together define a packed array forming said patty; and (d) agitator means for agitating said food material adjacent the upstream side of said foraminous member to dislodge tissue fibers that may have lodged on the upstream side of said foraminous member, said agitator bar including spaced-apart teeth with at least one tooth received between two adjacent ribs.

11. The apparatus in accordance with claim 10 in which said mold parts include a mold plate defining said mold opening; in which said apparatus includes means for moving said mold plate in a first straight line path between a patty ejecting position and a patty molding position; in which said foraminous member ribs are each oriented at a common angle skewed relative to said first straight line path; in which said agitator bar teeth are also oriented at said common angle skewed relative to said first straight line path; in which said means for reciprocating said agitator bar includes a drive bar extending across the upstream side of said foraminous member; in which said drive bar includes at least one elongate guide slot oriented with its length generally normal to said first straight line path; in which said agitator bar includes at least one guide pin projecting away from said foraminous member and received within said drive bar slot; and in which said means for reciprocating said agitator bar further includes means for reciprocating said drive bar across said upstream side of said foraminous member in opposite directions along a path parallel to said first straight line path whereby movement of said agitator bar in a direction parallel to both said agitator bar teeth and to said foraminous member ribs is accommodated by displacement of said agitator bar normal to said first straight line path as said agitator bar guide pin is guided within said drive bar guide slot.

12. A subassembly for modifying an apparatus for molding a patty of plastic food material which contains tissue fibers, said apparatus including at least (1) a food material reservoir, (2) a mold plate defining a mold opening adapted to be moved between a patty molding position and a patty ejecting position spaced away from said patty molding position, said mold opening defining at least a portion of a mold cavity into which the food material is forced from said food material reservoir to form a molded patty when said mold opening is in said patty molding position, and (3) means for cyclically moving said mold plate between said patty molding position and said patty ejecting position, said subassembly comprising:

(a) a foraminous member having an upstream side and a downstream side, said foraminous member having a plurality of apertures arranged in rows with said apertures extending from said upstream side to said downstream side, said foraminous member having a plurality of slots extending therethrough with each slot connecting adjacent apertures in one of said rows, said foraminous member being adapted for being disposed between said food material reservoir and said mold plate at a location for being in registry with said mold opening when said mold plate is in said patty molding position;

(b) a pair of plates disposed below said foraminous member, said pair of plates defining an interior chamber adjacent the upstream side of said foraminous member, said chamber opening upwardly in communication with said foraminous member and said chamber opening downwardly for being in communication with said food material reservoir;

(c) a pair of drive rods slidably disposed between said pair of plates for reciprocating movement parallel to the direction of movement of said mold plate; and (d) agitator means for agitating said food material adjacent the upstream side of said foraminous member to dislodge tissue fibers that may have lodged on the upstream side of said foraminous member whereby portions of some of said fibers may pass through said foraminous member slots, said agitator means including an agitator bar carried by said drive rods for reciprocation across the upstream side of said foraminous member.

13. The subassembly in accordance with claim 12 in which each said drive rod includes an end adapted to be engaged by said means for moving said mold plate whereby movement of said agitator bar occurs during at least a part of the movement of said mold plate.

* * * * *

UNITED STATES PATENT AND TRADEMARK OFFICE
CERTIFICATE OF CORRECTION

PATENT NO. : 4,535,505
DATED : August 20, 1985
INVENTOR(S) : Harry H. Holly and James A. Holly It is certified that error appears in the above-identified patent and that said Letters Patent is hereby corrected as shown below:

Column 17, lines 10-13, should be deleted in their entirety;

Column 17, line 14, "10" should be --9--;

Column 17, line 46, "11" should be --10-- and "10" should be --9--;

Column 18, line 11, "12" should be --11--; and

Column 18, line 58, "13" should be --12-- and "12" should be --11--.

Signed and Sealed this

Twenty-fourth Day of December 1985

[SEAL]

Attest:

DONALD J. QUIGG

Attesting Officer

Commissioner of Patents and Trademarks